United States Patent
Ihm et al.

(10) Patent No.: US 8,165,240 B2
(45) Date of Patent: Apr. 24, 2012

(54) METHOD FOR TRANSMITTING SIGNALS IN COMMUNICATION SYSTEM WITH MULTIPLE ANTENNAS

(75) Inventors: Bin Chul Ihm, Anyang-si (KR); Moon Il Lee, Yongin-si (KR); Jin Young Chun, Seoul (KR); Jae Won Jang, Suwon-si (KR); Jin Hyuk Jung, Ansan-si (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 12/282,856

(22) PCT Filed: Mar. 14, 2007

(86) PCT No.: PCT/KR2007/001238
§ 371 (c)(1),
(2), (4) Date: Jan. 21, 2009

(87) PCT Pub. No.: WO2007/105904
PCT Pub. Date: Sep. 20, 2007

(65) Prior Publication Data
US 2009/0220023 A1    Sep. 3, 2009

Related U.S. Application Data

(60) Provisional application No. 60/783,104, filed on Mar. 14, 2006.

(30) Foreign Application Priority Data

Oct. 16, 2006 (KR) .................. 10-2006-0100445

(51) Int. Cl.
*H04B 7/02* (2006.01)
(52) U.S. Cl. ........................................... 375/267
(58) Field of Classification Search .................. 375/267, 375/295, 299
See application file for complete search history.

(56) References Cited

U.S. PATENT DOCUMENTS

| | | | |
|---|---|---|---|
| 2003/0067993 A1 | 4/2003 | Viswanathan | |
| 2004/0067739 A1* | 4/2004 | Sim et al. ...................... | 455/101 |
| 2005/0251723 A1* | 11/2005 | Ilani ............................. | 714/752 |
| 2006/0035643 A1* | 2/2006 | Vook et al. .................... | 455/450 |
| 2007/0165566 A1* | 7/2007 | Khan et al. .................... | 370/329 |

OTHER PUBLICATIONS

Rouquette, S. et al; "Orthogonal Full Diversity Space-Time Block Coding Based on Transmitchannel State Information for 4 Tx Antennas." Communications, 2002. ICC 2002. IEEE International Conference; Published 2002; vol. 1 pp. 558-562.

* cited by examiner

*Primary Examiner* — Don N Vo
(74) *Attorney, Agent, or Firm* — Lee, Hong, Degerman, Kang & Waimey

(57) ABSTRACT

A wireless communication system and more particularly a method for signals in a system using a plurality of antennas are disclosed. In the method for multi-antenna-encoding data symbols to be transmitted through the plurality of antennas, at least two same data symbols multi-antenna-encoded are formed and transmitted repeatedly. Accordingly, it is possible to enhance transmission efficiency.

8 Claims, 4 Drawing Sheets

[Fig. 1]
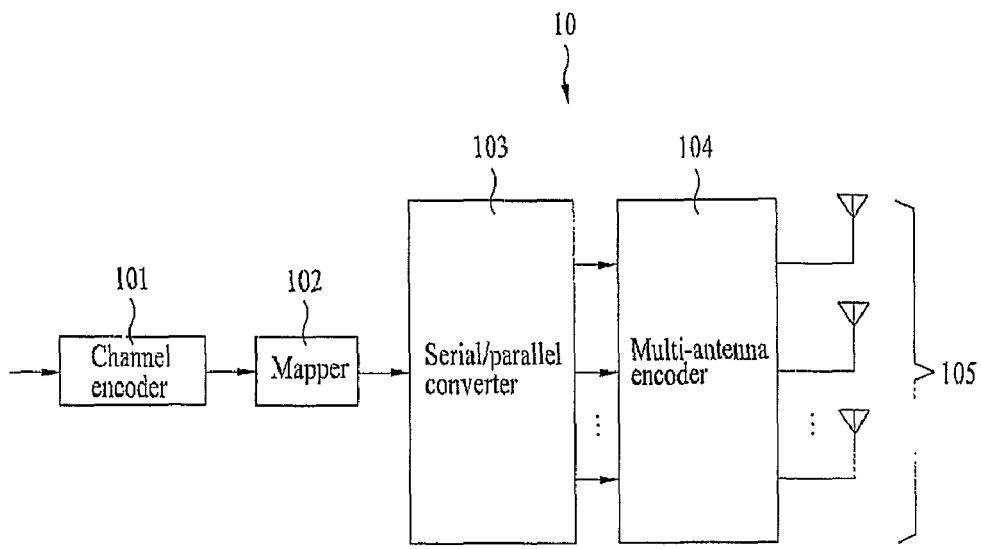
[Fig. 2]
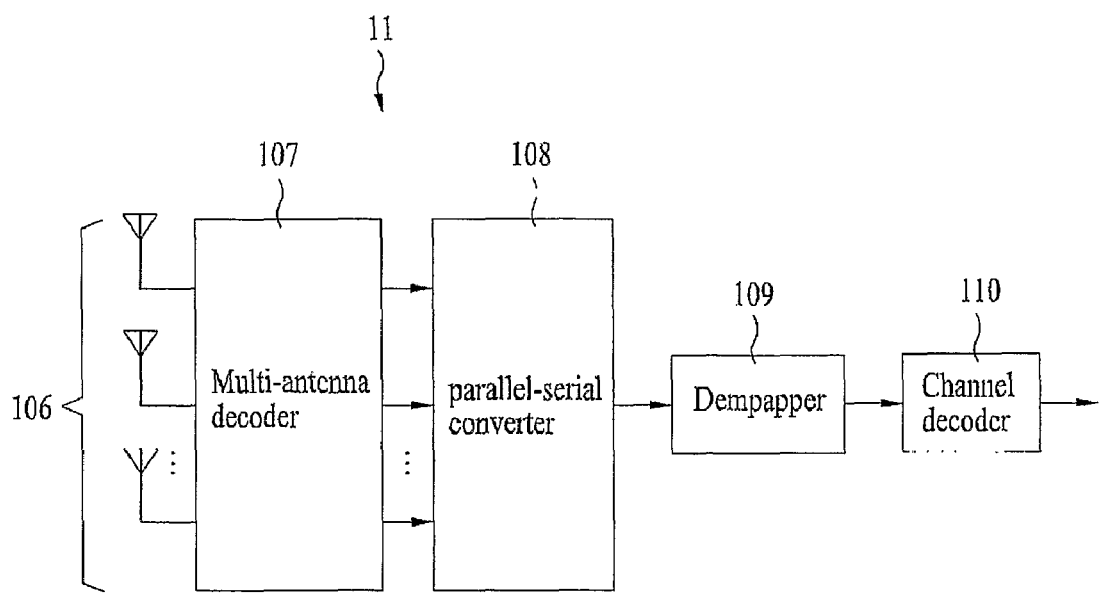

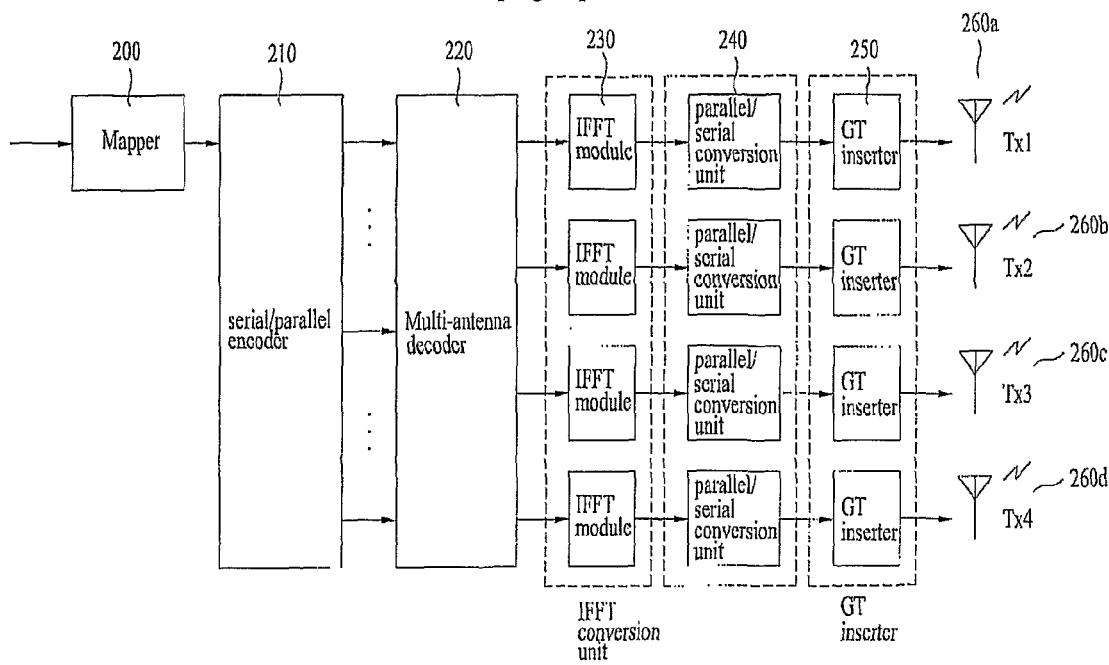
[Fig. 3]

[Fig. 5]
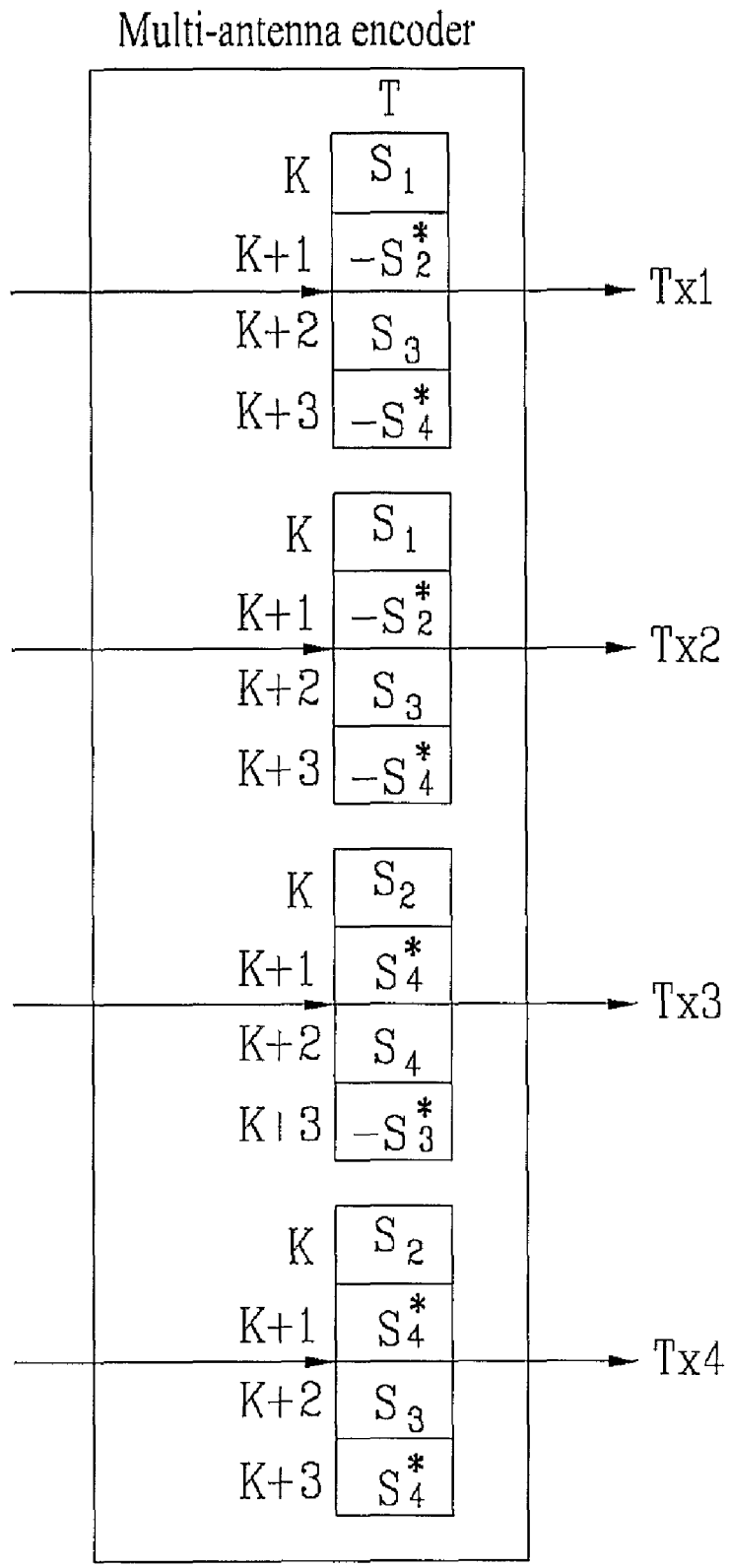

METHOD FOR TRANSMITTING SIGNALS IN COMMUNICATION SYSTEM WITH MULTIPLE ANTENNAS

CROSS-REFERENCE TO RELATED APPLICATIONS

This application is the National Stage filing under 35 U.S.C. 371 of International Application No. PCT/KR2007/001238, filed on Mar. 14, 2007, which claims the benefit of earlier filing date and right of priority to Korean Patent Application No. 10-2006-0100445, filed on Oct. 16, 2006, and also claims the benefit of U.S. Provisional Application Ser. No. 60/783,104, filed on Mar. 14, 2006.

TECHNICAL FIELD

The present invention relates to a wireless communication system, and more particularly, to a method for transmitting signals in a system using a plurality of antennas.

BACKGROUND ART

Recently, a method for mounting and using a plurality of antennas in a transmitter/receiver is attracting much attention and is actively being developed as a method for increasing the efficiency of wireless resources. Since a space for using resources is additionally ensured through the plurality of antennas, it is possible to increase the reliability of a communication link through a diversity gain or to increase transmission capacity through parallel transmission due to spatial multiplexing without increasing the bandwidth.

DISCLOSURE OF INVENTION

Technical Problem

An object of the present invention devised to solve the problem lies on a multi-antenna-encoding method capable of more efficiently transmitting signals using a plurality of antennas.

Technical Solution

The object of the present invention can be achieved by providing a method for transmitting signals in a system using a plurality of antennas, the method comprising multi-antenna-encoding at least two data symbols in a first data symbol group to form at least two same second data symbol groups and transmitting same data symbols among data symbols in the at least two same second data symbol groups through different antennas of the plurality of antennas.

The second data symbol groups may be including multi-antenna-encoded data symbols of the first data symbol group according to an orthogonal design condition. The data symbol may be multiplied by a weight. The weight may be a complex number and the multi-antenna-encoding of the data symbol multiplied by the weight satisfies an orthogonal design condition. And, a single transmitting unit for transmitting one of the data symbol groups may include at least one transmission resource comprising a time slot and a sub-carrier allocated to each of the plurality of antennas.

The method may further comprise receiving feedback information generated at a receiver through a channel vector of each of the antennas and multiplying by a weight to at least one data symbol in the first data symbol group using the received feedback information.

The feedback information may be a plus/minus sign information of any one of a real number part and an imaginary number part of a correlation coefficient wherein the correlation coefficient is computed by using the channel vector.

In another aspect of the present invention, a method for transmitting signals in a system using a plurality of antennas, the method comprising generating at least two transmitting symbols using at least data symbols, multi-antenna-encoding the at least two transmitting symbols in a first transmitting symbol group to form at least two same second transmitting symbol groups, and transmitting same transmitting symbols among transmitting symbols in the at least two same second transmitting symbol groups through different antennas of the plurality of antennas.

The transmitting symbol may be generated by using at least one of a sum of the data symbols and a difference between the data symbols. a single transmitting unit for transmitting one of the transmitting symbol groups may include at least one transmission resource comprising a time slot and a sub-carrier allocated to each of the plurality of antennas.

In another aspect of the present invention, a method for transmitting signals in a system using a plurality of antennas, the method comprising multi-antenna-encoding at least two data symbols on a first data symbol group according to an orthogonal design condition to form a second data symbol group, and transmitting a data symbol in the second data symbol group through at least two different antennas of the plurality of antennas at least twice.

The second data symbol group may be including multi-antenna-encoded data symbols of the first data symbol group according to an orthogonal design condition. And, a single transmitting unit for transmitting one of the data symbol groups may include at least one transmission resource comprising a time slot and a sub-carrier allocated to each of the plurality of antennas.

Advantageous Effects

As described above, in a mobile communication system using a plurality of transmission antennas according to an embodiment of the present invention, it is possible to efficiently use the plurality of antennas and transmission resources allocated to the antennas. In addition, it is possible to more simply demodulate reception signals. Furthermore, it is possible to provide a method for efficiently transmitting reception signals to enhance communication performance.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a block diagram showing a transmission system including a plurality of transmission antennas.

FIG. 2 is a block diagram showing a reception system including a plurality of reception antennas.

FIG. 3 is a block diagram showing a transmission system according to a preferred embodiment of the present invention.

FIG. 5 is a drawing explaining another preferred embodiment of the present invention.

MODE FOR THE INVENTION

Figure 4:
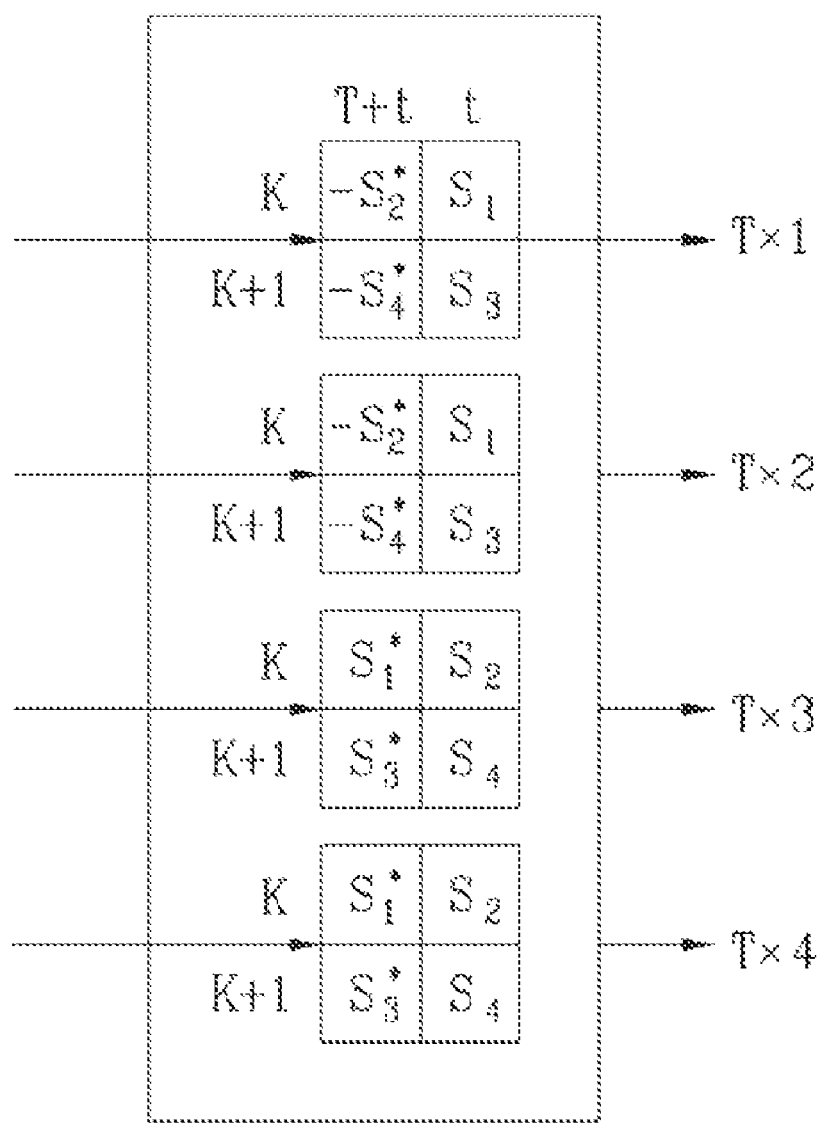
FIG. 4 is a drawing explaining the preferred embodiment of the present invention.

Reference will now be made in detail to the preferred embodiments of the present invention, examples of which are illustrated in the accompanying drawings.

Hereinafter, multi-antenna-encoding methods according to embodiments of the present invention are provided. In the multi-antenna-encoding methods, encoding information may be represented by a predetermined matrix. Hereinafter, the predetermined matrix is referred to as an encoding matrix and the embodiments of the present invention will be described using the encoding matrix in detail. The encoding matrix includes a predetermined number of antennas and a predetermined number of transmission resources in a matrix unit. The plurality of antennas can be more efficiently used by the multi-antenna-encoding method according to the present invention.

Additional advantages, objects, and features of the invention will be more readily apparent from consideration of the following detailed description relating to the accompanying drawings. Hereinafter, the embodiments of the present invention will be described in detail with reference to the accompanying drawings.

First, the configurations of a transmitter and a receiver in a system including a plurality of antennas according to the embodiments of the present invention will be described.

FIG. 1 is a block diagram showing a transmission system including a plurality of transmission antennas. Referring to FIG. 1, a transmitter 10 includes a channel encoder 101, a mapper 102, a serial/parallel (S/P) converter 103, a multi-antenna encoder 104, and a plurality of transmission (Tx) antennas 105.

The channel encoder 101 attaches duplicated bits or redundancy bits to data bits to reduce channel noise. The S/P converter 103 converts serial data into parallel data. The mapper 102 performs constellation mapping for converting the data bits into data symbols. The multi-antenna encoder 104 converts the data symbols into transmission signals. A method for transmitting the data symbols through the space, time and frequency resources is determined and the data symbols are outputted from the multi-antenna encoder 104 according to the determination. The multi-antenna encoder 104 may perform space-time block coding, space-frequency block coding, and space-time frequency coding. The plurality of transmission antennas 105 transmits the signals multi-antenna-encoded by the multi-antenna encoder.

FIG. 2 is a block diagram showing a reception system including a plurality of reception antennas. Referring to FIG. 2, a receiver 11 includes a plurality of reception antennas 106, a multi-antenna decoder 107 corresponding to the multi-antenna encoder 104 of transmission system, a parallel/serial (P/S) converter 108, a demapper 109 corresponding to the mapper 102 of the transmission system, and a channel decoder 110.

The plurality of reception antennas 106 receives the signals through channels. The multi-antenna decoder 107 converts the transmission signals multi-antenna-encoded by the multi-antenna encoder 104 into data symbols. The parallel/serial converter 108 converts the parallel data symbols into serial data symbols. The demapper 109 demaps and converts the serial data symbols into bit information. The channel decoder 110 decodes the bit information using the channel code used in the channel encoder 101 to estimate data.

Hereinafter, examples of a method for multi-antenna-encoding the time, space and frequency resources using the multi-antenna encoder 104 will be described. A transmission resource includes a time slot and a sub-carrier.

Table 1 shows an example of the multi-antenna-encoding method for space-time-frequency transmit diversity (SFFTD)

TABLE 1

| | Antenna 1 | Antenna 2 | Antenna 3 | Antenna 4 |
|---|---|---|---|---|
| Time t Sub-carrier k | $s_1$ | $s_2$ | 0 | 0 |
| Time t + T Sub-carrier k | $-s_2^*$ | $s_1^*$ | 0 | 0 |
| Time t Sub-carrier k + 1 | 0 | 0 | $s_3$ | $s_4$ |
| Time t + T Sub-carrier k + 1 | 0 | 0 | $-s_4^*$ | $s_3^*$ |

According to the multi-antenna-encoding method shown in Table 1, a plurality (four, in Table 1) of antenna resources and a plurality (four, in Table 1) of transmission resources are allocated, but only some (two, in Table 1) of the transmission resources allocated to the antenna resources is used.

Table 2 shows an example of the multi-antenna-encoding method for space-frequency transmit diversity.

TABLE 2

| | Antenna 1 | Antenna 2 | Antenna 3 | Antenna 4 |
|---|---|---|---|---|
| Time t Sub-carrier k | $s_1$ | $s_2$ | 0 | 0 |
| Time t Sub-carrier k + 1 | $-s_2^*$ | $s_1^*$ | 0 | 0 |
| Time t Sub-carrier k + 2 | 0 | 0 | $s_3$ | $s_4$ |
| Time t Sub-carrier k + 3 | 0 | 0 | $-s_4^*$ | $s_3^*$ |

According to the multi-antenna-encoding method shown in Table 2, a multi-antenna-encoding method using a plurality (four, in Table 2) of frequency resources with respect to the same time resource is suggested. Even in this case, only some (two, in the Table 2) of the transmission resources allocated to the antenna resources are used. In this case, the diversity effect of the time resource cannot be obtained.

The allocated time, frequency and space resources cannot be sufficiently used by the above-described multi-antenna-encoding methods. The multi-antenna decoding method of the receiver may include a process of computing a complicated inverse matrix for a complex number matrix. In this process, the complex number operation becomes complicated as the size of the matrix increases and thus imposes a heavy burden on the system. Accordingly, the embodiments of the present invention will now be described. First, the configuration of a transmitter according to the embodiments of the present invention will be described in more detail.

FIG. 3 is a block diagram showing a transmission system according to a preferred embodiment of the present invention. Referring to FIG. 3, a transmission system includes a mapper 200, a serial/parallel converter 210, a multi-antenna encoder 220, an IFFT converter 230, a parallel/serial conversion unit 240, a guard interval (GI) insertion unit 250, and transmission antenna modules 260a to 260d.

The mapper 200 converts data bit string into at least two data symbols $s_1, s_2, s_3, \ldots$ and $s_i$ in order to transmit data. That is, the mapper 200 receives the data bit string and generates and outputs at least two data symbols through a constellation mapping method (for example, QPSK, 16QAM, etc.).

The serial/parallel converter 210 converts the serial data symbols into parallel data symbols and outputs the parallel data symbols. The parallel data symbols converted by the serial/parallel converter 210 are inputted to the multi-antenna encoder 220. The multi-antenna encoder 220 encodes the inputted data symbols according to antenna, time and frequency resources. That is, the multi-antenna-encoding is performed between any adjacent symbols or sub-carriers with respect to a predetermined number of antennas. The result or procedure of performing the multi-antenna-encoding may be represented by a matrix. Hereinafter, a matrix for representing the multi-antenna-encoding is referred to as an encoding matrix.

The IFFT converter 230 includes a plurality of IFFT modules corresponding to the plurality of transmission antennas. Each IFFT module allocates the inputted data symbols to given sub-carriers to convert the data symbols into time-domain signals. That is, the IFFT converter 230 receives the data symbols which are divided into antenna signals by the multi-antenna-encoding and maps the sub-carriers to the data symbols according to the transmission antennas. The parallel/serial conversion unit 240 includes a plurality of parallel/serial converters. Each parallel/serial converter converts the inputted parallel signals into serial data symbols. The serial data symbols outputted from the parallel/serial converter are inputted to the GI insertion unit 250. The guard insertion unit 250 includes a plurality of guard interval inserters. Each guard interval inserter inserts a guard interval between the symbols in order to prevent inter-channel interference. The data symbols having the guard interval are transmitted through each of the transmission antennas 260a to 260d.

In the encoding matrix according to an embodiment of the present invention, a predetermined number of antennas and a predetermined number of transmission resources allocated to the antennas form a single transmission unit. The transmission resource is configured by independently allocating a time-slot resource and a sub-carrier resource. An example of using four transmission antennas and four transmission resources in a single transmission unit will be described. The resource may include a first resource having a time slot t and a sub-carrier k, a second resource having a time slot t+T and a sub-carrier k, a third resource having a time slot t and a sub-carrier k+1, and a fourth resource having a time slot t+T and a sub-carrier k+1.

FIG. 4 is a drawing explaining the multi-antenna-encoding method using the multi-antenna encoder according to an embodiment of the present invention. Hereinafter, an example of the multi-antenna-encoding method according to the present invention will be described with reference to FIG. 3.

In the following embodiments of the present invention, a data rate is 1 and four transmission antennas and four transmission resources are used. The data rate indicates a ratio of the predetermined number of transmission antennas to the number of data symbols transmitted in the transmission unit composed of the predetermined number of transmission resources. For example, if the number of transmission antennas is four and the number of data symbols $s_1$, $s_2$, $s_3$ and $s_4$ transmitted in the transmission unit is four, the data rate is 1.

The operations of the mapper 200, the serial/parallel converter 210, the multi-antenna encoder 220, the IFFT converter 230, the parallel/serial conversion unit 240, the GI insertion unit 250, and the transmission antenna modules 260a to 260d included in this transmission system are equal to those included in the system shown in FIG. 2. However, this transmission system is different from the system shown in FIG. 2 in the encoding method of the multi-antenna encoder 220. Hereinafter, the multi-antenna-encoding method will be described in detail.

Table 3 shows an encoding matrix for explaining a multi-antenna-encoding method according to an embodiment of the present invention.

TABLE 3

| | Antenna 1 | Antenna 2 | Antenna 3 | Antenna 4 |
|---|---|---|---|---|
| Time t Sub-carrier k | $s_1$ | $s_1$ | $s_3$ | $s_2$ |
| Time t + T Sub-carrier k | $-s_2^*$ | $-s_2^*$ | $s_1^*$ | $s_1^*$ |
| Time t Sub-carrier k + 1 | $s_3$ | $s_3$ | $s_4$ | $s_4$ |
| Time t + T Sub-carrier k + 1 | $-s_4^*$ | $-s_4^*$ | $s_3^*$ | $s_3^*$ |

According to the encoding matrix shown in FIG. 3, a multi-antenna system transmits symbols $s_1$, $s_2$, $s_3$ and $s_4$ through four antennas. Signals which will be transmitted through the respective antennas are formed using the four data symbols $s_1$, $s_2$, $s_3$ and $s_4$ by an orthogonal design. The data symbols are transmitted through the respective antennas and the same data symbols are repeatedly transmitted using at least two transmission antennas.

Each transmission antenna will be described with reference to FIG. 4. Multi-antenna-encoded data symbols $s_1$, $-s_2^*$, $s_3$ and $-s_4^*$ are transmitted through a first antenna Tx1 and a second antenna Tx2. Multi-antenna-encoded data symbols $s_2$, $s_1^*$, $s_4$ and $s_3^*$ are transmitted through a third antenna Tx3 and a fourth antenna Tx4.

Each of the transmission resources of the first antenna Tx1 and the second antenna Tx2 will now be described. In the first resource having the time slot t and the sub-carrier k, the data symbol $s_1$ is repeatedly transmitted twice through the antennas. In the second resource having the time slot t+T and the sub-carrier k, the data symbol $-s_2^*$ for forming a matrix structure using a code matrix based on the orthogonal design is repeatedly transmitted twice. In the third resource having the time slot t and the sub-carrier k+1, the data symbol $s_3$ is repeatedly transmitted twice. In the fourth resource having the time slot t+T and the sub-carrier k+1, the data symbol $-s_4^*$ is transmitted twice. At this time, the data symbols which are repeatedly transmitted twice are transmitted through the first antenna Tx1 and the second antenna Tx2.

A third antenna Tx3 and a fourth antenna Tx4 transmit the data symbols $s_2$, $s_1^*$, $s_4$ and $-s_3^*$ using the same method as the method for transmitting the data symbols $s_1$, $-s_2^*$, $s_3$ and $-s_4^*$ through the first antenna Tx1 and the second antenna Tx2.

When the data symbols are transmitted using the above-described method, all the transmission resources allocated to the antennas can be used and thus resource use efficiency is enhanced. That is, since one transmission resource is transmitted using only two antennas in the encoding matrix shown in Table 1, the transmission resources allocated to the rest of the antennas are not used. In contrast, since all the allocated transmission resources are used in the encoding matrix shown in Table 3, the resource use efficiency is enhanced. In addition, the diversity effect of the time, space and frequency resources can be obtained.

When the multi-antenna-encoding is performed by this encoding matrix, a first row and a second row in the matrix shown in Table 3 are orthogonal to each other according to the orthogonal design. That is, if the first row (time slot t and the sub-carrier k) is $r_1$ and the second row (time slot t+T and the sub-carrier k) is $r_2$, $r_1 = [s_1, s_1, s_2, s_2]$, $r_2 = [-s_2^*, -s_2^*, s_1^*, s_1^*]$ is obtained. The sum $r_1 r_2^H$ of the inner products of the rows of the above vector becomes 0 When the sum of the inner products becomes 0 the rows are orthogonal to each other.

In the encoding matrix, when all rows and columns do not satisfy orthogonality, the decoding process of the receiver requires a complicated process of obtaining an inverse matrix for a matrix corresponding to a reception equation composed of a channel vector. However, when the matrix shown Table 3 is used, rows and columns are designed to be orthogonal to each other. Accordingly, the process of decoding the multi-antenna-encoded data symbols is performed by a simple linear computation, without using the complicated process. That is, when the transmitted matrix is orthogonally designed, the decoding process is performed in the unit of symbols. Accordingly, the structure of the receiver is simplified and thus received signals can be restored using only a simple linear computation. Therefore, the complexity of the receiver is relatively low according to the number of antennas.

Now, the encoding matrix shown in Table 1 and the encoding matrix shown in Table 3 will be compared.

Equation 1 shows a reception equation when signals are multi-antenna-encoded using the encoding matrix shown in Table 1.

$$\begin{bmatrix} x_k(t) \\ x_k^*(t+T) \\ x_{k+1}(t) \\ x_{k+1}^*(t+T) \end{bmatrix} = \begin{bmatrix} h_{1,k} & h_{2,k} & 0 & 0 \\ h_{2,k}^* & -h_{1,k}^* & 0 & 0 \\ 0 & 0 & h_{3,k+1} & h_{4,k+1} \\ 0 & 0 & h_{4,k+1}^* & -h_{3,k+1}^* \end{bmatrix} \begin{bmatrix} s_1 \\ s_2 \\ s_3 \\ s_4 \end{bmatrix} + v \quad \text{Equation 1}$$

In Equation 1, $h_{m,k}$ denotes a channel vector corresponding to an $n^{th}$ transmission antenna of the sub-carrier k, and v denotes a noise signal. The goodness of a channel state can be determined using a signal-to-noise ratio (SNR) When Equation 1 is obtained, Equation 2 is obtained by computing the SNR of the data symbol $s_1$.

$$SNR = (\|h_{1,k}\|^2 + \|h_{2,k}\|^2)\frac{\partial_s^2}{\partial_N^2} \quad \text{Equation 2}$$

In Equation 2, $\partial_s^2$ denotes the power of a signal and $\partial_N^2$ denotes the power of noise. When the values of $\partial_s^2$ and $\partial_N^2$ are specified by a user, $\partial_s^2$ and $\partial_N^2$ are fixed without changing according $\partial_N^2$ to the channel state and thus the SNR is proportional to the value of $(\|h_{1,k}\|^2 + \|h_{2,k}\|^2)$ Equation 3 shows a reception equation when signals are multi-antenna-encoded using the encoding matrix shown in Table 3.

$$\begin{bmatrix} x_k(t) \\ x_k^*(t+T) \\ x_{k+1}(t) \\ x_{k+1}^*(t+T) \end{bmatrix} = \quad \text{Equation 3}$$

$$\begin{bmatrix} h_{1,k}+h_{2,k} & h_{2,k}+h_{4,k} & 0 & 0 \\ h_{3,k}^*+h_{4,k}^* & -(h_{1,k}^*+h_{2,k}^*) & 0 & 0 \\ 0 & 0 & h_{1,k+1}+h_{2,k+1} & h_{2,k+1}+h_{4,k+1} \\ 0 & 0 & h_{3,k+1}^*+h_{4,k+1}^* & -(h_{1,k+1}^*+h_{2,k+1}^*) \end{bmatrix} \begin{bmatrix} s_1 \\ s_2 \\ s_3 \\ s_4 \end{bmatrix} + v$$

Equation 4 shows a reception equation when transmission power is equal to that of when signals are transmitted using the encoding matrix shown in Table 1.

$$\begin{bmatrix} x_k(t) \\ x_k^*(t+T) \\ x_{k+1}(t) \\ x_{k+1}^*(t+T) \end{bmatrix} = \quad \text{Equation 4}$$

$$\frac{1}{\sqrt{2}}\begin{bmatrix} h_{1,k}+h_{2,k} & h_{2,k}+h_{4,k} & 0 & 0 \\ h_{3,k}^*+h_{4,k}^* & -(h_{1,k}^*+h_{2,k}^*) & 0 & 0 \\ 0 & 0 & h_{1,k+1}+h_{2,k+1} & h_{2,k+1}+h_{4,k+1} \\ 0 & 0 & h_{3,k+1}^*+h_{4,k+1}^* & -(h_{1,k+1}^*+h_{2,k+1}^*) \end{bmatrix} \begin{bmatrix} s_1 \\ s_2 \\ s_3 \\ s_4 \end{bmatrix} + v$$

Similar to Equation 1, $h_{m,k}$ shown in Equations 3 and 4 denotes a channel vector corresponding to an $m^{th}$ transmission antenna of the sub-carrier k and v denotes a noise signal.

When Equation 4 is obtained, Equation 5 is obtained by computing the SNR of the data symbol $s_1$.

$$SNR = (\|h_{1,k}+h_{2,k}\|^2 + \|h_{3,k}+h_{4,k}\|^2)/2\frac{\partial_s^2}{\partial_N^2} \quad \text{Equation 5}$$

where, $h_{m,k}$, $\partial_s^2$ and $\partial_N^2$ shown Equation 5 have the same meanings as those of Equations 1 and 2. Similarly, when the values of $\partial_s^2$.

and $\partial_N^2$ are specified by the user, $\partial_s^2$ and $\partial_s^2$ are fixed without changing according to the channel state and thus the SNR is proportional to the value of $(\|h_{1,k}+h_{2,k}\|^2+\|h_{3,k}+h_{4,k}\|^2)/2$ When $(\|h_{1,k}+h_{2,k}\|^2+\|h_{3,k}+h_{4,k}\|^2)/2$ is expanded, Equation 6 is obtained.

$$(\|h_{1,k}\|^2+\|h_{2,k}\|^2+\|h_{3,k}\|^2+\|h_{4,k}\|^2+\text{real}(\rho_{1,2})\|h_{1,k}\|\|h_{2,k}\|+ \text{real}(\rho_{3,4})\|h_{2,k}\|\|h_{4,k}\|)/2 \quad \text{Equation 6}$$

where, $\rho_{1,2}$ in Equation 6 denotes a correlation coefficient between the antenna 1 and the antenna 2, and $\rho_{3,4}$ denotes a correlation coefficient between the antenna 3 and the antenna 4.

$\rho_{1,2}$ and $\rho_{3,4}$ are expressed by Equation 7.

$$\rho_{1,2}=h_{1,k}{}^H h_{2,k}/\|h_{1,k}\|\|h_{2,k}\|, \rho_{3,4}=h_{3,k}{}^H h_{4,k}/\|h_{3,k}\|\|h_{4,k}\| \quad \text{Equation 7}$$

Accordingly, when the signals are transmitted according to the encoding matrix shown in Table 3, a higher SNR is obtained if $\text{real}(\rho_{3,4})>0$ and $\text{real}(\rho_{1,2})>0$.

Thus, the decoding effect is improved. That is, when the signals transmitted through the antenna 1 and the antenna 2 have the same plus/minus sign and the signals transmitted through the antenna 3 and the antenna 4 have the same plus/minus sign, a higher SNR is obtained.

In a communication system, when the receiver checks the transmission channel state and feeds back information on the channel state to the transmitter, the transmitter can enhance data transmission efficiency using the feedback information. When the transmitter forms a transmission signal, a method for forming the transmission signal using the feedback information transmitted from the receiver is called a closed loop method. Unlike the closed loop method, a method which does not use the feedback information is called an open loop method.

A case where the suggested multi-antenna-encoding method is used in the closed loop method will be described. The receiver can determine whether the value of a real number part or an imaginary number part of the correlation coefficient is a positive number or negative number using the feedback information of the channel vector. Accordingly, when the value of the correlation coefficient is a positive number, a signal having a minus sign is transmitted such that the value of the real number part or the imaginary number part of the correlation coefficient always becomes a negative number. As a result, a higher SNR can be obtained. That is, the receiver computes the correlation coefficient using the transmission channel vector. The transmitter transmits a signal having a plus sign when the value of the correlation coefficient is a positive number and a signal having a minus sign when the value of the correlation coefficient is a negative number. Accordingly, the value of the real number part or the imaginary number part of the correlation coefficient can always become a positive number and thus a high SNR can be obtained.

However, when the multi-antenna-encoding method is used in the open loop method, the above-described information cannot be obtained and thus the value of the real number part or the imaginary number part of the correlation coefficient may become a negative number. Therefore, the SNR may decrease. In this case, the data symbols are transmitted in the units of packet and signals having the plus/minus sign corresponding to the data symbols contained in a packet may be alternately transmitted. Half of the transmission symbols may be transmitted using the encoding matrix shown in Table 3 and the rest of the transmission symbols may be transmitted using the encoding matrix shown in Table 4.

TABLE 4

|  | Antenna 1 | Antenna 2 | Antenna 3 | Antenna 4 |
| --- | --- | --- | --- | --- |
| Time t Sub-carrier k | $s_1$ | $-s_1$ | $s_2$ | $-s_2$ |
| Time t + T Sub-carrier k | $-s_2{}^*$ | $s_2{}^*$ | $s_1{}^*$ | $-s_1{}^*$ |
| Time t Sub-carrier k + 1 | $s_3$ | $-s_3$ | $s_4$ | $-s_4$ |
| Time t + T Sub-carrier k + 1 | $-s_4{}^*$ | $s_4{}^*$ | $s_3{}^*$ | $-s_3{}^*$ |

When the encoding matrixes shown in Tables 3 and 4 are alternately used in the transmission units at a same ratio, a selectivity gain is improved at the time of decoding a channel.

Table 5 is obtained by generalizing the encoding matrix shown in Table 3.

TABLE 5

|  | Antenna 1 | Antenna 2 | Antenna 3 | Antenna 4 |
| --- | --- | --- | --- | --- |
| Time t Sub-carrier k | $\alpha s_1$ | $\beta s_1$ | $\gamma s_2$ | $\xi s_2$ |
| Time t + T Sub-carrier k | $-\gamma^* s_2{}^*$ | $-\xi^* s_2{}^*$ | $\alpha^* s_1{}^*$ | $\beta^* s_1{}^*$ |

Table 5 shows a case of generalizing two upper rows, that is, the data symbols $s_1$ and $s_2$. Two lower rows, that is, the data symbols $s_3$ and $s_4$, may be generalized to be expanded using the similar method.

The values a, b, g and x shown in Table 5 are complex number parameters and may be modified to any value except for 0 if the matrix satisfies $r_1 r_2{}^H=0$.

For example, in the open loop method, the parameters a, b, g and x may be set to any complex numbers. As a simplest method, for example, a case of +1/−1 and +/−j will be described. In Table 3, a=1, b=+/1, g=1 and x=+/−1. A power ratio may be different from one another, like (a=0.8, b=+/−0.2, g=0.8, x=+/−0.2) and (a=0.2, b=+/−0.8, g=0.2, x=+/−0.8 In the closed loop method, the receiver can feed back at least one of the power ratio and the plus/minus sign value of the correlation coefficient.

Table 6 shows an example of the encoding matrix when a weight is added using the feedback information transmitted from the receiver.

TABLE 6

|  | Antenna 1 | Antenna 2 | Antenna 3 | Antenna 4 |
| --- | --- | --- | --- | --- |
| Time t Sub-carrier k | $\alpha s_1$ | $\text{sign}(\rho_{1,2}^{re})\beta s_1$ | $\gamma s_2$ | $\text{sign}(\rho_{3,4}^{re})\xi s_2$ |
| Time t + T Sub-carrier k | $-\gamma^* s_2^*$ | $-\text{sign}(\rho_{1,2}^{re})\xi^* s_2^*$ | $\alpha^* s_1^*$ | $\text{sign}(\rho_{3,4}^{re})\beta^* s_1^*$ |

As can be seen from Table 6, the power ratios a and b and the plus/minus sign value of the correlation coefficient are fed back from the receiver and the coefficient and the sign of the symbols which will be transmitted using the method shown in the encoding matrix are determined using the power ratios and the plus/minus signal value of the correlation coefficient. The Sign( ) is a function for generating the plus/minus sign values of $$\rho_{1,2}^{re}$$

and $$\rho_{3,4}^{re}.$$

A method for obtaining $$\rho_{1,2}^{re}$$

and $$\rho_{3,4}^{re}$$

is expressed by Equation 8.

$$\rho_{1,2}^{re}=\text{real}(\rho_{1,2}),\ \rho_{3,4}^{re}=\text{real}(\rho_{3,4}) \quad \text{Equation 8}$$

As can be seen from Equation 8, $$\rho_{1,2}^{re}$$

and $$\rho_{3,4}^{re}$$

denote the values of the real number parts of the correlation coefficient.

FIG. 5 is a view explaining another preferred embodiment of the present invention. Hereinafter, another example of the multi-antenna-encoding method will be described with reference to FIG. 5. In the present embodiment of the present invention, the data rate is 1 and four transmission antennas and four transmission resources are used.

When the time-varying degree of a channel is large, a channel is changed between successive OFDM symbols and the frequency selective characteristics of the channel are not strong, the multi-antenna-encoding may be applied between the symbols of the adjacent sub-carriers (sub-channels) In this case, the multi-antenna-encoding is performed in a frequency domain. The operations of the mapper 200, the serial/parallel converter 210, the multi-antenna encoder 220, the IFFT converter 230, the parallel/serial conversion unit 240, the GI insertion unit 250, and the transmission antenna modules 260a to 260d included in the transmission system are equal to those included in the system shown in FIG. 2. However, the transmission system is different from the system shown in FIG. 2 in the encoding method of the multi-antenna encoder 220. Hereinafter, an example of the encoding method when a unit of transmission resource is composed of four sub-carriers k, k+1, k+2 and k+3 with respect to the same time slot t will be described in detail.

Table 7 shows an example of the encoding matrix using four sub-carriers.

TABLE 7

|  | Antenna 1 | Antenna 2 | Antenna 3 | Antenna 4 |
| --- | --- | --- | --- | --- |
| Time t Sub-carrier k | $\alpha s_1$ | $\beta s_1$ | $\gamma s_2$ | $\xi s_2$ |
| Time t Sub-carrier k + 1 | $-\gamma^* s_2^*$ | $-\xi^* s_2^*$ | $\alpha^* s_1^*$ | $\beta^* s_1^*$ |

The encoding matrix shown in Table 7 is different from the matrix shown in Table 5 in the transmission resource. That is, the data symbols contained in a single transmission unit are transmitted using four different sub-carriers with respect to the same time slot T. Even in this case, the structure for repeatedly transmitting the same data symbols through two transmission antennas is applied similarly. That is, the data symbols $s_1$, $-s_2^*$, $s_3$ and $-s_4^*$ which will be allocated to the four sub-carriers k, k+1, k+2 and k+3 are transmitted through the first antenna Tx1 and the second antenna Tx2 and the data symbols $s_2$, $s_1^*$, $s_4$ and $s_3^*$ are transmitted through the third antenna Tx3 and the fourth antenna Tx4.

Table 8 shows an example of the encoding matrix when a weight is added using the feedback information transmitted from the receiver.

TABLE 8

|  | Antenna 1 | Antenna 2 | Antenna 3 | Antenna 4 |
| --- | --- | --- | --- | --- |
| Time t Sub-carrier k | $\alpha s_1$ | $\text{sign}(\rho_{1,2}^{re})\beta s_1$ | $\gamma s_2$ | $\text{sign}(\rho_{3,4}^{re})\xi s_2$ |
| Time t Sub-carrier k + 1 | $-\gamma^* s_2^*$ | $-\text{sign}(\rho_{1,2}^{re})\xi^* s_2^*$ | $\alpha^* s_1^*$ | $\text{sign}(\rho_{3,4}^{re})\beta^* s_1^*$ |

The encoding matrix shown in Table 8 is obtained by applying the multi-antenna-encoding between the adjacent sub-channels (sub-carriers) through the four sub-carrier resources with respect to the matrix shown in Table 6. That is, the multi-antenna-encoding is performed in the frequency domain. In the closed loop method, the power ratios a and b and the plus/minus sign value of the correlation coefficient is fed back from the receiver and the coefficient and sign of the symbols to be transmitted are determined using the method shown in the encoding matrix using the power ratios and the plus/minus signal value.

The antenna index of the encoding matrix is not limited to the above-described table and may be changed. That is, the data symbols arranged in the columns of the matrixes may be transmitted through other antennas, instead of the antennas shown in the table.

Table 9 shows an example of the encoding matrix in consideration that the transmission antennas are not fixed.

TABLE 9

|  | Antenna 1 | Antenna 2 | Antenna 3 | Antenna 4 |
|---|---|---|---|---|
| Time t<br>Sub-carrier k | $\alpha s_1$ | $\xi s_2$ | $\beta s_1$ | $\gamma s_2$ |
| Time t + T<br>Sub-carrier k | $-\gamma^* s_2^*$ | $\beta^* s_1^*$ | $-\xi^* s_2^*$ | $\alpha^* s_1^*$ |

Table 9 shows an embodiment in which the antenna index may be arbitrarily specified by exchanging the signals transmitted through the antennas 2 and 3 in the encoding matrix shown in Table 5 with each other.

As another embodiment, the signals including a weighted sum (weighted difference) of at least one data symbol with respect to the transmission resources allocated to the plurality of antennas may be multi-antenna-encoded and transmitted. Even in this case, the same data symbols are transmitted through the same transmission resources of the plurality of antennas, thereby increasing transmission efficiency. Table 10 shows an example of the encoding matrix using a method for repeatedly transmitting signals including at least one data symbol.

TABLE 10

|  | Antenna 1 | Antenna 2 | Antenna 3 | Antenna 4 |
|---|---|---|---|---|
| Time t<br>Sub-carrier k | $s_1 + \alpha s_3$ | $s_1 + \alpha s_3$ | $s_2 + \alpha s_4$ | $s_2 + \alpha s_4$ |
| Time t + T<br>Sub-carrier k | $-s_2^* - \alpha^* s_4^*$ | $-s_2^* - \alpha^* s_4^*$ | $s_1^* + \alpha^* s_3^*$ | $s_1^* + \alpha^* s_3^*$ |
| Time t<br>Sub-carrier k + 1 | $s_1 - \alpha s_3$ | $s_1 - \alpha s_3$ | $s_2 - \alpha s_4$ | $s_2^* - \alpha s_4$ |
| Time t + T<br>Sub-carrier k + 1 | $-s_2^* + \alpha^* s_4^*$ | $-s_2^* + \alpha^* s_4^*$ | $s_1^* - \alpha^* s_3^*$ | $s_1^* - \alpha^* s_3^*$ |

Table 10 shows the multi-antenna-encoding method which can be applied when four data symbols $s_1$, $s_2$, $s_3$ and $s_4$ are transmitted using four antennas and four transmission resources (when the data rate is 1. In the encoding matrix shown in Table 10, a weighted sum of the data symbols $s_1$ and $s_3$ and another weighted sum of the data symbols $s_2$ and $s_4$ are transmitted. A weighted sum of the data symbols $s_1$ and $s_3$ is denoted by x1, a weighted sum of the data symbols $s_2$ and $s_4$ is denoted by x2, a weighted difference between the data symbols $s_1$ and $s_3$ is denoted by x3, and a weighted difference between the data symbols $s_2$ and $s_4$ is denoted by x4. When the weighted sum (weighted difference) of the data symbols is obtained, a may become $e^{jq}$ and q is an adjustable parameter. In the transmission method shown in Table 10, the weighted sum (weighted difference) of the same data symbols is transmitted using two antennas. The data $x_1$, $-x_2^*$, $x_3$ and $-x_4^*$ are transmitted through the first antenna and the second antenna and the data $x_2$, $x_1^*$, $x_4$ and $x_3^*$ are transmitted through the third antenna and the fourth antenna. In the multi-antenna-encoding method shown in Table 10, the antennas are not limited to the antennas shown in Table 10 and the multi-antenna-encoded data may be transmitted through any of the antennas.

TABLE 11

|  | Antenna 1 | Antenna 2 | Antenna 3 | Antenna 4 |
|---|---|---|---|---|
| Time t<br>Sub-carrier k | $s_1 + \alpha s_3$ | $s_1 + \alpha s_3$ | $s_2 + \alpha s_4$ | $s_2 + \alpha s_4$ |
| Time t + T<br>Sub-carrier k | $-s_2^* - \alpha^* s_4^*$ | $-s_2^* - \alpha^* s_4^*$ | $s_1^* + \alpha^* s_3^*$ | $s_1^* + \alpha^* s_3^*$ |
| Time t<br>Sub-carrier k + 1 | $s_1 - \alpha s_3$ | $s_2 - \alpha s_4$ | $s_1 - \alpha s_3$ | $s_2 - \alpha s_4$ |
| Time t + T<br>Sub-carrier k + 1 | $-s_2^* + \alpha^* s_4^*$ | $s_1^* - \alpha^* s_3^*$ | $-s_2^* + \alpha^* s_4^*$ | $s_1^* - \alpha^* s_3^*$ |

Table 11 shows an encoding matrix for transmitting the data $x_3$ and $-x_4^*$ through the first antenna and the third antenna and the data $x_4$ and $x_3^*$ through the second antenna and the fourth antenna with respect to a third resource and a fourth resource of the encoding matrix shown in Table 10. That is, the antenna index is not restricted in the encoding matrix or a single transmission unit.

Even when the weighted sum (weighted difference) of the transmission symbols is transmitted, the multi-antenna-encoding may be applied between the four adjacent sub-carriers (sub-channels) with respect to the same time slot. Tables 12 and 13 show the multi-antenna-encoding method in the frequency domain.

TABLE 12

|  | Antenna 1 | Antenna 2 | Antenna 3 | Antenna 4 |
|---|---|---|---|---|
| Time t Sub-carrier k | $s_1 + \alpha s_3$ | $s_1 + \alpha s_3$ | $s_2 + \alpha s_4$ | $s_2 + \alpha s_4$ |
| Time t Sub-carrier k + 1 | $-s_2^* - \alpha^* s_4^*$ | $-s_2^* - \alpha^* s_4^*$ | $s_1^* + \alpha^* s_3^*$ | $s_1^* + \alpha^* s_3^*$ |
| Time t Sub-carrier k + 2 | $s_1 - \alpha s_3$ | $s_1 - \alpha s_3$ | $s_2 - \alpha s_4$ | $s_2 - \alpha s_4$ |
| Time t Sub-carrier k + 3 | $-s_2^* + \alpha^* s_4^*$ | $-s_2^* + \alpha^* s_4^*$ | $s_1^* - \alpha^* s_3^*$ | $s_1^* - \alpha^* s_3^*$ |

Table 12 shows an encoding matrix using transmission resources different from those of the encoding matrix shown in Table 10, which is applicable to a case where the sub-carrier resources k, k+1, k+2 and k+3 are allocated to the same time slot resources t.

TABLE 13

|  | Antenna 1 | Antenna 2 | Antenna 3 | Antenna 4 |
|---|---|---|---|---|
| Time t Sub-carrier k | $s_1 + \alpha s_3$ | $s_1 + \alpha s_3$ | $s_2 + \alpha s_4$ | $s_2 + \alpha s_4$ |
| Time t Sub-carrier k + 1 | $-s_2^* - \alpha^* s_4^*$ | $-s_2^* - \alpha^* s_4^*$ | $s_1^* + \alpha^* s_3^*$ | $s_1^* + \alpha^* s_3^*$ |
| Time t Sub-carrier k + 2 | $s_1 - \alpha s_3$ | $s_2 - \alpha s_4$ | $s_1 - \alpha s_3$ | $s_2 - \alpha s_4$ |
| Time t Sub-carrier k + 3 | $-s_2^* + \alpha^* s_4^*$ | $s_1^* - \alpha^* s_3^*$ | $-s_2^* + \alpha^* s_4^*$ | $s_1^* - \alpha^* s_3^*$ |

Table 13 shows an encoding matrix using the transmission resources different from those of the encoding matrix shown in Table 11, which is applicable to a case where the sub-carrier resources k, k+1, k+2 and k+3 are allocated to the same time slot resources t.

As another embodiment, the data symbols which are subjected to the multi-antenna-encoding, the IFFT, the parallel/serial conversion, and the GI insertion may be transmitted through at least two transmission antennas. That is, a method for repeatedly transmitting the same data symbols can be implemented by performing the processes from the multi-antenna-encoding to the GI insertion with respect to the data symbols to be transmitted repeatedly and transmitting the data symbols through the plurality of transmission antennas.

In the embodiments of the present invention described using the above-described tables, the time, frequency and antenna allocated to the rows and columns may be arbitrarily set and the present invention is not limited to the embodiments described in the present specification. The method for multi-antenna-encoding the data symbols using the encoding matrixes may be performed using the multi-antenna encoder or other devices for performing the multi-antenna-encoding method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used in a communication system, a wireless communication system or a multi-antenna system.

The invention claimed is:

1. A method for transmitting signals in a system using a plurality of antennas, the method comprising:
   multi-antenna-encoding a plurality of data symbols to form a plurality of transmitting symbol groups each of which corresponds to an antenna among the plurality of antennas and has a plurality of transmitting symbols generated from the plurality of data symbols; and
   transmitting each of the plurality of transmitting symbol groups through a corresponding antenna among the plurality of antennas using a group of time-frequency resources,
   wherein at least two antennas among the plurality of antennas transmit transmitting symbols generated from a same data symbol on a same time-frequency resource in the group of time-frequency resources,
   wherein a number of the plurality of antennas is 4, and transmitting symbols transmitted through each of the 4 antennas using two time-frequency resources in the group of time-frequency resources are represented by a first matrix as follows:

$$\begin{bmatrix} \alpha s_1 & \beta s_2 & \gamma s_2 & \xi s_2 \\ -\gamma^* s_2^* & -\xi^* s_2^* & \alpha s_1^* & \beta s_1^* \end{bmatrix},$$

wherein each row of the first matrix represents a time-frequency resource and each column of the first matrix represents an antenna, and each element of the first matrix represents a transmitting symbol transmitted through i-th antenna (i=1, 2, 3, 4) using j-th time-frequency resource (j=1, 2), where $s_1$ and $s_2$ are data symbols and $\alpha$, $\beta$, $\gamma$ and $\xi$ are complex number parameters other than zero to make an inner product of a first row vector of the first matrix and a second row vector of the first matrix become zero.

2. The method according to claim 1, wherein each of the plurality of data symbols is multiplied by a weight.

3. The method according to claim 2, wherein the weight is a complex number and an inner product of $r_1$ and $r_2$ becomes zero, where $r_1$ is a vector consisting of transmitting symbols transmitted through one of the at least two antennas and $r_2$ is a vector consisting of transmitting symbols transmitted through the other one of the at least two antennas.

4. The method according to claim 1, wherein the group of time-frequency resources includes a plurality of time-frequency resources each of which is defined by a time slot and a sub-carrier allocated to each of the plurality of antennas.

5. The method according to claim 1, further comprising:
receiving feedback information generated at a receiver through a channel vector of each of the plurality of antennas; and
multiplying by a weight to at least one data symbol to generate a transmitting symbol group using the received feedback information.

6. The method according to claim 5, wherein the feedback information is a plus/minus sign information of any one of a real number part and an imaginary number part of a correlation coefficient, wherein the correlation coefficient is computed by using the channel vector.

7. The method according to claim 1, wherein each transmitting symbol in each of the plurality of transmitting symbol groups is generated by using at least one of a sum of two data symbols among the plurality of data symbols and a difference between the two data symbols.

8. The method according to claim 1, wherein the plurality of data symbols are s1, s2, s3 and s4, and transmitting symbols transmitted through each antenna using four time-frequency resources in the group of frequency resources are represented by a second matrix as follows:

$$\begin{bmatrix} s_1 & s_1 & s_2 & s_2 \\ -s_2^* & -s_2^* & s_1^* & s_1^* \\ s_3 & s_3 & s_4 & s_4 \\ -s_4^* & -s_4^* & s_3^* & s_3^* \end{bmatrix},$$

wherein each row of the second matrix represents a time-frequency resource and each column of the second matrix represents an antenna, and each element of the second matrix represents a transmitting symbol transmitted through i-th antenna (i=1, 2, 3, 4) and j-th time-frequency resource (j=1, 2, 3, 4).

* * * * *